E. M. COSNER.
DISPENSER.
APPLICATION FILED OCT. 23, 1917.
1,294,056.
Patented Feb. 11, 1919.
3 SHEETS—SHEET 1.
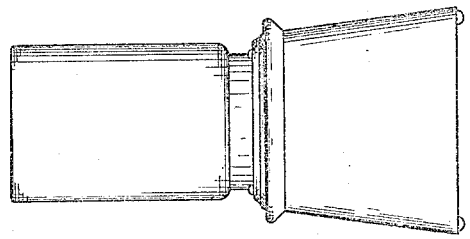
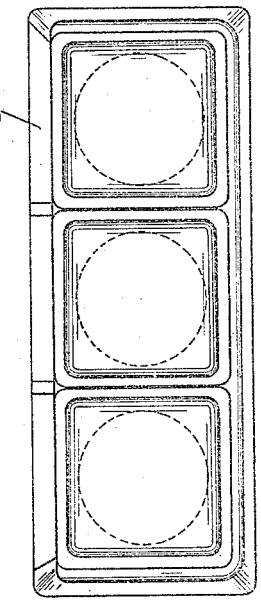
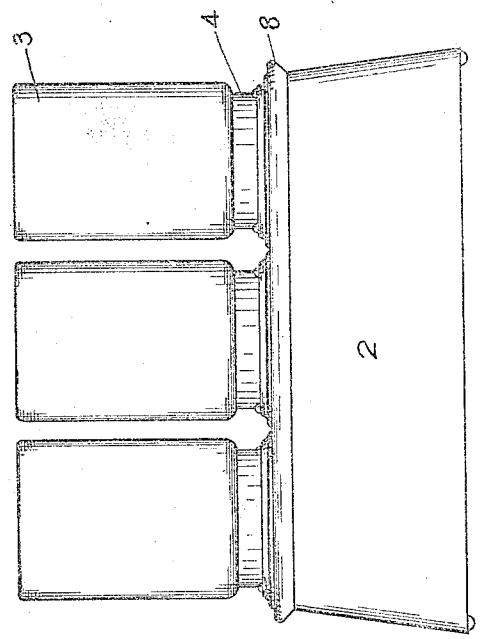
Edgar M. Cosner, Inventor E. M. COSNER.
DISPENSER.
APPLICATION FILED OCT. 23, 1917.
1,294,056.
Patented Feb. 11, 1919.
3 SHEETS—SHEET 2.
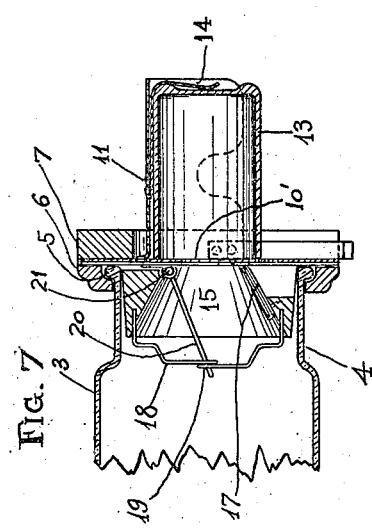
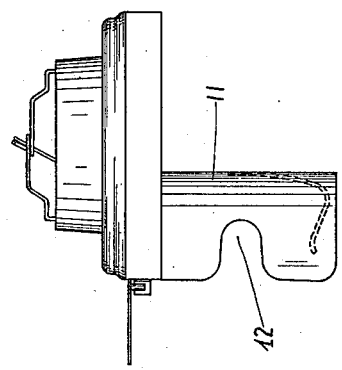
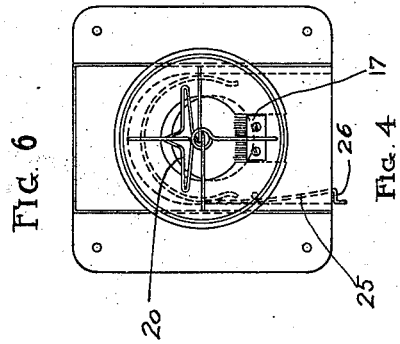
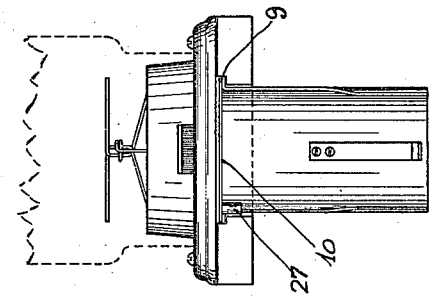
Edgar M. Cosner. Inventor E. M. COSNER.
DISPENSER.
APPLICATION FILED OCT. 23, 1917.
1,294,056.
Patented Feb. 11, 1919.
3 SHEETS—SHEET 3.
FIG. 8
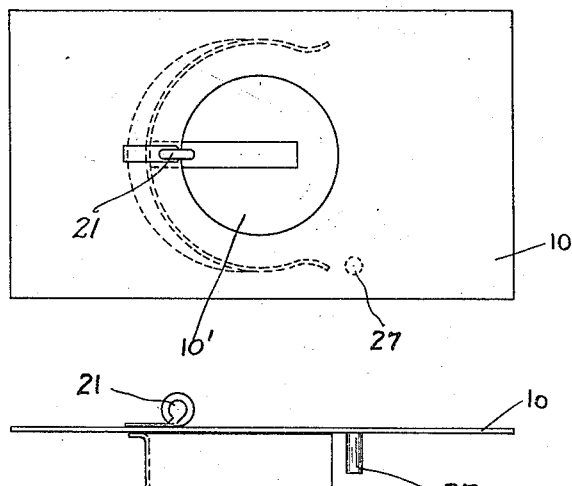
FIG. 9
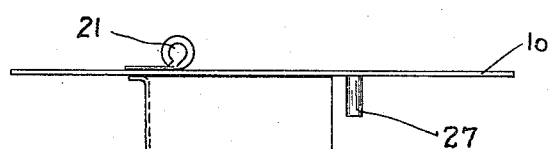
Edgar M. Cosner, Inventor
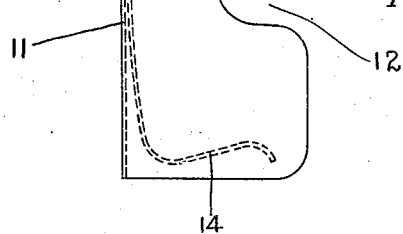
Attorneys

UNITED STATES PATENT OFFICE.

EDGAR M. COSNER, OF DENVER, COLORADO.

DISPENSER.

1,294,056.  Specification of Letters Patent.  Patented Feb. 11, 1919.

Application filed October 23, 1917. Serial No. 198,128.

*To all whom it may concern:*

Be it known that I, EDGAR M. COSNER, a citizen of the United States, residing at Denver, in the county of Denver and State of Colorado, have invented certain new and useful Improvements in Dispensers; and I do hereby declare the following to be a full, clear, and exact description of the invention, such as will enable others skilled in the art to which it appertains to make and use the same.

This invention relates to a dispensing apparatus and more particularly to a device for dispensing nuts, confections and various semi-fluid masses and has for its object the providing of a simple, practical and inexpensive and readily operated device for the dispensing of nuts, confections, etc., and has also for an object the providing for the measuring of the quantities of material dispensed from the apparatus.

A further object of the invention is to provide for the breaking of bridging or arching of the material contained in the apparatus and thereby prevent choking of the discharge of the substance, and the invention has for a further object the provision of means for evening the surface of the quantity of material after it has been issued from the container of the apparatus into any simple receiver or cup.

With these and other objects in view the invention consists in the whole, the construction, the combination of the parts and in details and elements as more fully hereinafter described, and illustrated in the accompanying drawings.

Figure 1 is a side elevation of the apparatus.

Fig. 2 is a plan view.

Fig. 3 is an end view.

Fig. 4 is a front elevation in detail of the cup holder, with a slide and base and the funnel separate from the casing of the apparatus, showing the container in dotted lines.

Fig. 5 is a side elevation of Fig. 4.

Fig. 6 is a plan view of Fig. 4, and

Fig. 7 is a central vertical section through the container and a funnel, and the base and cup slide mounted thereon.

Fig. 8 is a plan view of the detached slide.

Fig. 9 is a side elevation of the detached slide.

My invention may be embodied in an apparatus of any suitable size, design and material of construction, and utilized for dispensing various materials such as nuts and semi-fluid confections, etc. In Figs. 1, 2 and 3 a casing 2, forms a chamber upon the top of which is supported one or more containers, of glass or other suitable material, 3, in the form here shown of inverted jars having necks 4, which are shown as provided with beads 5 each being engaged by a collar 6 which is secured upon a base 7 formed as a part of, or which may rest upon the top 8 of the casing 2.

The base 7 is provided with slide-ways 9 which open forwardly to the front of the case, indicated at letter F in Fig. 2, and in which slide-ways there is mounted a slide 10 in the form of a plate having attached to and depending from its bottom side a suitably shaped shell-like holder 11 of substantially semi-cylindrical form. The front vertical edges are cut away as at 12 to form the opening for permitting the easy adjustment and removing of a cup as 13, Fig. 7 within the cup holder 11.

The latter is provided with a resilient or yielding bottom 14 upon which the cup 13 may be disposed and by which it is held yieldingly in position against the bottom of the slide 10, which is provided with aperture 10' and which, when the slide containing the cup has been pushed rearwardly on its ways 9 to base 7, is adapted to register with a discharge or outlet funnel 15 disposed on the base 7 and overhanging the top of slide 10.

The funnel, as shown, has a slightly conical form and is encompassed by the mouth or neck of the container 3 so that the contents of the container may be readily passed through the funnel into the cup deposited on the receiver or cup holder 11.

For the purpose of smoothing off, and providing for the discharge of a uniformly measured quantity from the contents of the container 3, there is provided at the front of the interior of funnel 15 a brush 17 transversely disposed across the top of the slide and wiping thereon when the latter is transferred forwardly so as to even off the top of the material in the cup 13 as the slide is moving forward.

Some difficulty is sometimes encountered in dispensing of nuts or other granular mass or semi-fluid by reason of the arching and bridging of the material as it issues from the container and to obviate this difficulty I provide a guide in the form of a wire bridge 18 having a guide eye 19 through which there plays an agitator 20 which is pivotally connected at 21 to the top of the slide adjacent to the rear end thereof, the agitator 20 playing back and forth in the funnel as the slide is moved and therefore breaking up any bridge or arching tendency and insuring the free flow of material through the funnel and from the container.

A suitable form of latching device may be applied to temporarily lock cup slide in the forward position and is here shown as comprising a spring 25 attached to one side of the base 7 and just beneath the guide-way for the slide, the spring being provided with a shoulder 26 which is normally disposed in the path of a pin 27 fastened to the bottom of one side of the slide 10 so that when the latter is moved forward it will spring around the shoulder 26, which latter will prevent the slide being entered again until the spring is disengaged from the pin 27.

What is claimed as new is:

1. In a dispensing apparatus, a container, a discharge member communicating therewith, a base for the container and the member, a slide mounted in said base and having an outlet registerable with the member, and a cup-holder pendant from the slide.

2. In a dispensing apparatus, a container, a discharge member communicating therewith, a base for the container and the member, a slide mounted in said base and having an outlet registerable with the member, and a cup-holder pendant from the slide, and having means to retain an inserted cup in proper position.

3. In a dispensing apparatus, a container, a discharge member communicating therewith, a base for the container and the member, a slide mounted in said base and having an outlet registerable with the member, and a cup-holder pendant from the slide, and having yielding means to retain an inverted cup in proper position.

4. In a dispensing apparatus, a container, a discharge member communicating therewith, a base for the container and the member, a slide mounted in said base and having an outlet registerable with the member, and a cup-holder pendant from the slide, a guide supported above the member, and a stirrer connected to and oscillated by the slide and supported in said guide.

5. In a dispensing apparatus, a container, a discharge member communicating therewith, a base for the container and the member, a slide mounted in said base and having an outlet registerable with the member, and a cup holder pendant from the slide, and holder comprising a vertical shell with its sides notched to form finger recesses.

6. In a dispensing apparatus, a container, a discharge member communicating therewith, a base for the container and the member, a slide mounted in said base and having an outlet registerable with the member, and a cup holder pendant from the slide, and means for latching the holder in forward position.

7. In a dispensing apparatus, a container, a discharge member communicating therewith, a base for the container and the member, a slide mounted in said base and having an outlet registerable with the member, a cup holder pendant from the slide, and means for brushing over the slide as it is advanced.

In testimony whereof I affix my signature.

EDGAR M. COSNER.

Copies of this patent may be obtained for five cents each, by addressing the "Commissioner of Patents, Washington, D. C."